United States Patent
Gibbons et al.

[11] Patent Number: 5,958,293
[45] Date of Patent: Sep. 28, 1999

[54] PROCESS FOR INDUCING ALIGNMENT OF LIQUID CRYSTALS AND LIQUID CRYSTAL OPTICAL ELEMENTS

[75] Inventors: Wayne M. Gibbons, Bear, Del.; Paul Joseph Shannon, Exton, Pa.; Hanxing Zheng, Wilmington, Del.

[73] Assignee: Elsicon Inc., Wilmington, Del.

[21] Appl. No.: 09/080,639

[22] Filed: May 18, 1998

Related U.S. Application Data

[63] Continuation-in-part of application No. 08/624,945, Mar. 29, 1996, Pat. No. 5,807,498.

[51] Int. Cl.$^6$ .......................... C09K 19/56; C09K 19/00; B32B 27/00; G02F 1/1337
[52] U.S. Cl. .................. 252/299.4; 428/1; 428/473.5; 349/191
[58] Field of Search ................. 428/1, 473.5; 252/299.4; 349/191

[56] References Cited

U.S. PATENT DOCUMENTS

| | | | |
|---|---|---|---|
| 4,974,941 | 12/1990 | Gibbons et al. | 350/341 |
| 5,032,009 | 7/1991 | Gibbons et al. | 350/341 |
| 5,731,405 | 3/1998 | Gibbons et al. | 528/353 |

FOREIGN PATENT DOCUMENTS

| | | | |
|---|---|---|---|
| 580108 | 1/1994 | European Pat. Off. | |
| 6-202119 | 3/1992 | Japan | |

*Primary Examiner*—C H Kelly
*Attorney, Agent, or Firm*—Paul J. Shannon

[57] ABSTRACT

A process for inducing alignment of a liquid crystal medium adjacent to a surface of an optical alignment layer comprising: exposing at least one optical alignment layer to polarized light; the polarized light having a wavelength within the absorption band of said optical alignment layer; wherein the exposed alignment layer induces alignment of the liquid crystal medium at an angle + and $-\theta$ with respect to the direction of the polarization of the incident light beam and along the surface of the optical alignment layer; and applying a liquid crystal medium to the optical alignment layer, wherein the optical alignment layer is a polyimide comprising an an amine component having a 2-substituted 1,4-benzenediamine wherein the 2-substituent $X_1$ is an electron withdrawing group having a positive σ. Also claimed is a liquid crystal display element made by the process.

5 Claims, 2 Drawing Sheets

PROCESS FOR INDUCING ALIGNMENT OF LIQUID CRYSTALS AND LIQUID CRYSTAL OPTICAL ELEMENTS

CROSS-REFERENCE TO RELATED APPLICATION

This Application is a Continuation-in-Part of application U.S. Ser. No. 08/624,945, filed on Mar. 29, 1996 now issued as U.S. Pat. No. 5,807,498.

BACKGROUND OF INVENTION

The present invention relates to processes for aligning liquid crystals, and liquid crystal optical elements.

This invention was made with United States Government support under Agreement No. MDA972-93-2-0014 awarded by ARPA. The United States Government has certain rights in the invention.

Current liquid crystal display elements include a product that utilize a twisted nematic mode, i.e. having a structure wherein the aligning direction of nematic liquid crystal molecules is twisted by 90° between a pair of upper and lower electrode substrates, a product utilizing a supertwisted nematic mode, utilizing a birefringent effect, i.e. having a structure wherein the aligning direction of nematic liquid crystal molecules is twisted by 180° to 300°, an in-plane-switching mode wherein both electrodes controlling the liquid crystal alignment are present on one substrate and the direction of the liquid crystal orientation in the plane of the substrate changes upon application of an electric field, and a product utilizing a ferroelectric liquid crystal substance or an antiferroelectric liquid crystal substance. Common to each of these products is a liquid crystal layer disposed between a pair of substrates coated with a polymeric alignment layer. The polymeric alignment layer controls the direction of alignment of the liquid crystal medium in the absence of an electric field. Usually the direction of alignment of the liquid crystal medium is established in a mechanical buffing process wherein the polymer layer is buffed with a cloth or other fiberous material. The liquid crystal medium contacting the buffed surface typically aligns parallel to the mechanical buffing direction. Alternatively, an alignment layer comprising anisotropically absorbing molecules can be exposed to polarized light to align a liquid crystal medium as disclosed in U.S. Pat. No. 5,032,009 and 4,974,941 "Process of Aligning and Realigning Liquid Crystal Media" which are hereby incorporated by reference.

The process for aligning liquid crystal media with polarized light can be a noncontact method of alignment which has the potential to reduce dust and static charge buildup on alignment layers. Other advantages of the optical alignment process include high resolution control of alignment direction and high quality of alignment.

Requirements of optical alignment layers for liquid crystal displays include low energy threshold for alignment, transparency to visible light (no color), good dielectric properties and voltage holding ratios, long-term thermal and optical stability and in many applications a controlled uniform pre-tilt angle. Most liquid crystal devices, including displays, have a finite pre-tilt angle, controlled, for instance, by the mechanical buffing of selected polymeric alignment layers. The liquid crystal molecules in contact with such a layer aligns parallel to the buffing direction, but is not exactly parallel to the substrate. The liquid crystal molecules are slightly tilted from the substrate, for instance by about 2–15 degrees. For optimum performance in most display applications a finite and uniform pre-tilt angle of the liquid crystal is desirable.

Continuing effort has been directed to the development of processes and compositions for optical alignment of liquid crystals and liquid crystal displays. Through diligent effort and intensive experiments we have found that optical alignment of liquid crystals is especially effective when the optical alignment layers comprise polyimides containing specific structural units disclosed herein. A similar structural unit has been reported to be useful in mechanical buffing process. For instance, Japanese patent application JP 06,202, 119 (C.A. 122 106745z) describes a polyimide derived from alicyclic dianhydride and 2,5-diaminobenzonitrile as a mechanically buffed alignment layer for liquid crystal displays that exhibits good electrical properties. The inventors have found that the structural units described herein exhibit unexpectedly improved alignment quality and uniformity in an optical alignment process with polarized light.

SUMMARY OF INVENTION

The present invention provides a process for inducing alignment of a liquid crystal medium adjacent to a surface of an optical alignment layer comprising:

(a) exposing at least one optical alignment layer to polarized light; the polarized light having a wavelength within the absorption band of said optical alignment layer; wherein the exposed alignment layer induces alignment of the liquid crystal medium at an angle + and −θ with respect to the direction of the polarization of the incident light beam and along the surface of the optical alignment layer; and (b) applying a liquid crystal medium to the optical alignment layer, wherein the optical alignment layer is a polyimide of structure I

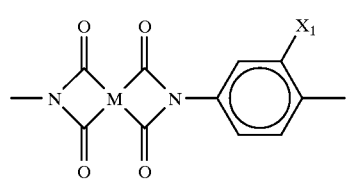

I comprising the reaction product of at least one tetracarboxylic dianhydride and an amine component, wherein the amine component comprises a 2-substituted 1,4-benzenediamine wherein the 2-substituent $X_1$ is an electron withdrawing group having a positive τ, and M is a tetravalent organic radical derived from said tetracarboxylic dianhydride containing at least two carbon atoms, no more than two carbonyl groups of the dianhydride being attached to any one carbon atom of the tetravalent radical.

DETAILED DESCRIPTION

Figure 1:
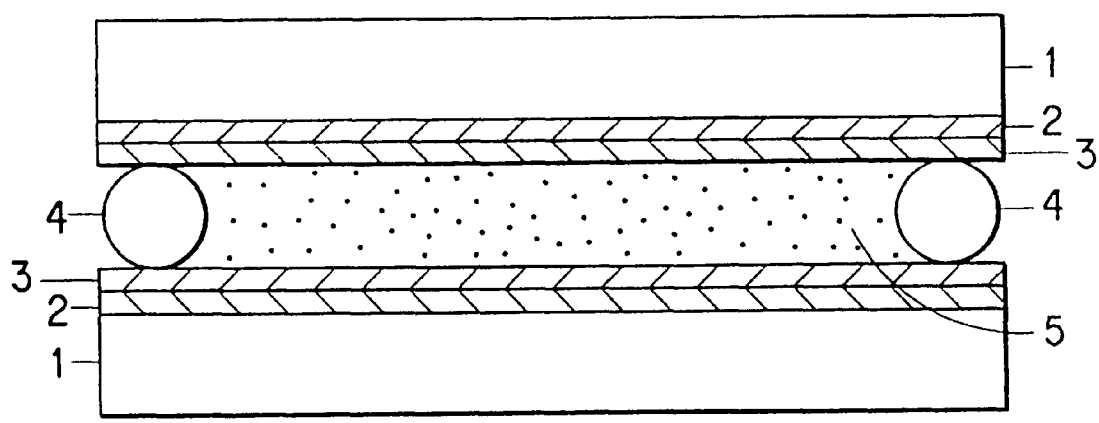
FIG. 1 is a cross-sectional view of a general liquid crystal display element of the present invention.

As used herein, the term "alignment layer" is the layer of material on the surface of a substrate that controls the alignment of a liquid crystal layer in the absence of an external field. A "conventional alignment layer" herein refers to an alignment layer that will only align a liquid crystal layer via processing other than optical means. For example, mechanically buffed polyimides, evaporated silicon dioxide, Langmuir-Blodgett films, have all been shown to align liquid crystals.

"Optical alignment layer" herein refers to an alignment layer that contains anisotropically absorbing molecules that will induce alignment of liquid crystals after exposure with polarized light. Optical alignment layers may be processed by conventional means, such as mechanical rubbing, prior to or after exposure to polarized light. The anisotropically absorbing molecules of the optical alignment layers exhibit absorption properties with different values when measured along axes in different directions. The anisotropic absorbing molecules exhibit absorption bands between 150 nm and about 2000 nm. The anisotropically absorbing molecules of the optical alignment layer can be covalently bonded within a main chain polymer, they can be covalently bonded as side groups to a main polymer chain, they can be present as nonbonded solutes in a polymer, or they can be in the adjacent liquid crystal layer as a solute and adsorbed on the surface of a normal alignment layer to give an optical alignment layer.

Preferred optical alignment layers have absorbance maxima of about from 150 to 1600 nm. More preferable optical alignment layers have absorbance maxima of about from 150 nm to 800 nm. Most preferable optical alignment layers for the present invention have absorbance maxima of about from 150 and 400 nm and especially about from 300 to 400 nm.

Anisotropically absorbing molecules that can be used in optical alignment layers and various methods for forming optical alignment layers are discussed in U.S. Pat. No. 5,731,405 entitled "Process and Materials for Inducing Pre-tilt in Liquid Crystals and Liquid Crystal Displays, hereby incorporated by reference.

Polymers especially useful and preferred in the optical process of this invention are polyimides. Polyimides are known for their excellent thermal and electrical stability properties and these properties are useful in optical alignment layers for liquid crystal displays. The preparation of polyimides is described in "Polyimides", D. Wilson, H. D. Stenzenberger, and P. M. Hergenrother Eds., Chapman and Hall, New York (1990). Typically polyimides are prepared by the condensation of one equivalent of a diamine with one equivalent of a dianhydride in a polar solvent to give a poly(amic acid) prepolymer intermediate.

The poly(amic acid) is typically formulated to give a 1 to 30 wt % solution. The condensation reaction is usually performed between room temperature and 150° C. The prepolymer solution is coated onto a desired substrate and thermally cured at between 180 and 300° C. to complete the imidization process. Alternatively, the poly(amic acid) prepolymer is chemically imidized by addition of a dehydrating agent to form a polyimide polymer.

In preparing polyimides for optical alignment layers the molar ratio of diamine to dianhydride usually is 1:1, but can vary between 0.8:1 to 1.2:1. The preferred ratio of diamine to dianhydride is between 0.9:1 and 1.1:1.

Preferred in the process of this invention is a polyimide polymer of structure I

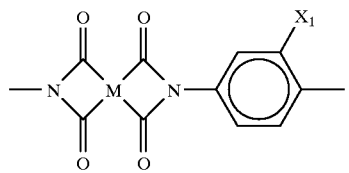

comprising the reaction product of at least one tetracarboxylic dianhydride and an amine component, wherein the amine component comprises a 2-substituted 1,4-benzenediamine wherein the 2-substituent $X_1$ is an electron withdrawing group having a positive σ, and M is a tetravalent organic radical derived from said tetracarboxylic dianhydride containing at least two carbon atoms, no more than two carbonyl groups of the dianhydride being attached to any one carbon atom of the tetravalent radical.

The propensity for an organic substituent to donate or withdraw electron density from a electronic system is described by the Hammett equation. J. March describes the Hammett equation in detail in "Advanced Organic Chemistry, Reactions, Mechanism, and Structure", McGraw-Hill, Publishers, New York 1977, p. 252–255. A positive value of σ indicates an electron-withdrawing group and a negative value an electron-donating group.

The quality of alignment resulting from the optical alignment process illustrated in the examples is summarized in Table 2. Example 1 and 2 show superior alignment quality to Examples 3 and 4, respectively. Examples 5 and 6, containing pre-tilt inducing amines, also show superior alignment to Examples 7 and 8. These results indicate electron withdrawing groups in 2-substituted-1,4-benzenediamines give polyimides that are substantially superior in the optical alignment process than polyimides derived from 5-substituted-1,3-benzenediamines.

Thus, more preferred in the process of the invention are polyimides of structure I wherein $X_1$ is selected from the group —CN, —CF$_3$, F, Cl, Br, I, —NO$_2$, —CO$_2$R, and —CON(R)$_2$, wherein R is H or a $C_1$–$C_4$ hydrocarbon. Most preferred in the process of the invention are polyimides of structure I wherein $X_1$ is selected from the group —CN and —CF$_3$.

Preferred in the process of this invention is a polyimide polymer that is a homopolyimide or a copolyimide of at least one diaryl ketone tetracarboxylic dianhydride and at least one diamine, which comprises at least one structural element of formula II:

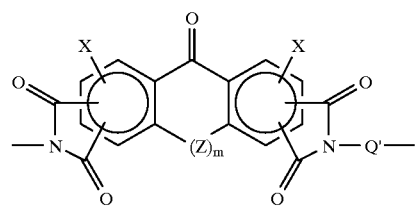

wherein Q' is a divalent organic radical derived from said diamine containing at least two carbon atoms; X is independently selected from the group consisting of H, Cl, F, Br, $R_1$ and $R_1$O—; wherein $R_1$ is independently selected from $C_1$–$C_3$ perfluorinated alkyl chain, $C_1$–$C_3$ partially flourinated alkyl chain and $C_1$–$C_8$ hydrocarbon chain; Z is selected from the group consisting of —S—, —$SO_2$—, —O—, —$CH_2CH_2$—, —$CH_2$—, —NR—, —$C(CF_3)_2$—, —C(O)—, or a covalent bond, wherein R is a $C_1$–$C_4$ hydrocarbon chain; and m is 1 or 0.

More preferred for the process of this invention are polyimide polymers that are derived from 3,3',4,4'-benzophenonetetracarboxylic dianhydride and 2,2'-dichloro-4,4',5,5'-benzophenone tetracarboxylic dianhydride. Both materials are colorless, provide reasonable solubility characteristics to the polyimides, and provide the necessary photoactive UV chromophore in high concentration.

The benzophenonetetracarboxylic dianhydrides are readily available from commercial sources or synthesis. For instance, 3,3',4,4'-benzophenonetetracarboxylic dianhydride (BTDA) is available from Aldrich Chemical Co., Inc. (1001 W. St. Paul Ave., Milwaukee, Wis. 53233). 2,2'-Dichloro-4, 4',5,5'-benzophenone tetracarboxylic dianhydride is available from 4-chloro-o-xylene by Friedel-Crafts acylation with oxalyl chloride to give 2,2'-dichloro-4,4',5,5',-tetramethylbenzophenone, followed by oxidation with nitric acid and dehydration of the resulting tetracarboxylic acid as described by Falcigno, et al., J. Poly. Sci. 1992, 30, 1433.

Other diaryl ketones dianhydrides that are useful in the process of the invention, wherein m is 1, are the polycyclic diaryl ketone dianhydrides described by Pfeifer, et al., in U.S. Pat. No. 4,698,295 and hereby incorporated by reference. Another diaryl ketone dianhydride that may be useful is 5,5'-[carbonylbis(4,1-phenyleneoxy)]bis-1,3-isobenzofuranone, Structure III:

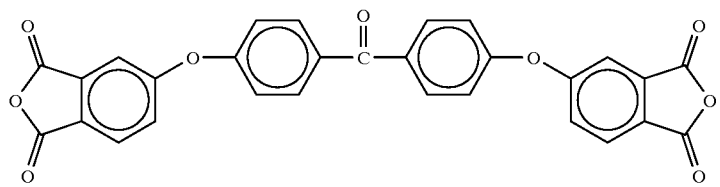

III

A wide variety of other dianhydrides, of course, may be used in forming polyimides useful in the process of the invention. Specific examples of the tetracarboxylic dianhydride component include aromatic dianhydrides such as pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 3,3'4,4'-biphenyltetracarboxylic dianhydride, 2,3,2',3'-biphenyltetracarboxylic dianhydride, bis(3,4-dicarboxyphenyl)ether dianhydride, bis(3,4-dicarboxyphenyl)diphenylsulfone dianhydride, bis(3,4-dicarboxyphenyl)methane dianhydride, 2,2-bis(3,4-dicarboxyphenyl)propane dianhydride, 1,1,1,3,3,3-hexafluoro-2,2 -bis(3,4-dicarboxyphenyl)propane dianhydride, bis(3,4-dicarboxyphenyl)dimethylsilane dianhydride, 2,3,4,5-pyridinetetracarboxylic dianhydride; alicyclic tetracarboxylic dianhydrides such as 1,2,3,4-butanetetracarboxylic dianhydride, 1,2,3,4-cyclobutanetetracarboxylic dianhydride, 1,2,3,4-cyclopentanetetracarboxylic dianhydride, 1,2,4,5-cyclohexanetetracarboxylic dianhydride, 2,3,5-tricarboxycyclopentylacetic acid dianhydride and 3,4-dicarboxy-1,2,3,4-tetrahydro-1-naphthalenesuccinic dianhydride; and their acid and acid chloride derivatives.

Specific diamines useful in this invention are readily available from commercial sources. For instance, 2-(trifluoromethyl)-1,4-benzenediamine is available from PCR Inc. (P.O. Box 1466, Gainesville, Fla. 32602); 2,5-diaminobenzonitrile is available from Frinton Laboratories (P.O. Box 2428, Vineland, N.J. 08360); 2-nitro-1,4-phenylenediamine is available from Aldrich Chemical Co., 1001 West Saint Paul Ave., Milwaukee, Wis. 53233; 2-chloro-1,4-phenylene diamine is available from Chemetall Chemical Products Co., 50 Valley Rd., Berkley Heights, N.J. 07922. Other useful diamines such as 2-fluoro-1,4-phenylene diamine, 2-bromo-1,4-phenylene diamine, methyl 2,5-diaminobenzoate, and 2,5-diaminobenzamide are available by synthesis.

To prepare the optical alignment layers of this invention poly(amic acid) solutions or preimidized polyimide solutions are coated onto desired substrates. Coating is usually accomplished with 2 to 30 wt % solids. Any conventional method may be used to coat the substrates including brushing, spraying, spin-casting, dipping or printing. The coated substrates are heated in an oven under an inert atmosphere, for instance nitrogen or argon, at elevated temperature usually not exceeding 300° C. and preferably at or below 180° C. for about from 1 to 12 hours, preferably for about 2 hours or less. The heating process removes the solvent carrier and may be used to further cure the polymer. For instance, the poly(amic) acid films are thermally cured to generate polyimide films.

The optical alignment layers are exposed to polarized light to induce alignment of liquid crystals. By "polarized light" is meant light that is elliptically polarized such that the light is more polarized along one axis (referred to as the major axis) versus the orthogonal axis (referred to as the minor axis). The preferred polarization is linearly polarized light where the light is polarized mostly along one axis (the major axis) with little or no polarization component along the minor axis. In this invention the polarized light has one or more wavelengths of about from 150 to 2000 nm and preferably of about from 150 and 1600 nm and more preferably about from 150 to 800 nm. Most preferably, the polarized light has one or more wavelengths of about from 150 to 400 nm, and especially about from 300 to 400 nm. A preferred source of light is a laser, e.g., an argon, helium neon, or helium cadmium. Other preferred sources of light are mercury arc deuterium and quartz tungsten halogen lamps, xenon lamps and black lights in combination with a polarizer. Polarizers useful in generating polarized light from nonpolarized light sources are interference polarizers made from dielectric stacks, absorptive polarizers and reflective polarizers based on Brewster reflection. With lower power lasers or when aligning small alignment regions, it may be necessary to focus the light beam onto the optical alignment layer.

By "exposing" is meant that polarized light is applied to the entire optical alignment layer or to a portion thereof. The light beam may be stationary or rotated. Exposures can be in one step, in bursts, in scanning mode or by other methods. Exposure times vary widely with the materials used, etc., and can range from less than 1 msec to over an hour. Exposure may be conducted before or after contacting the optical alignment layer with the liquid crystal medium. Exposing can be accomplished by linearly polarized light transmitted through at least one mask having a pattern or with a beam of linearly polarized light scanned in a pattern. Exposing also may be accomplished using interference of coherent optical beams forming patterns, i.e., alternating dark and bright lines.

Exposure energy requirements vary with the formulation and processing of the optical alignment layer prior and during exposure. For example, materials that possess high glass transition temperatures can have higher energy density requirements for optical alignment. Whereas, material systems designed to have a low glass transition temperature prior to exposure can have lower energy density requirements. A preferred range of exposure energy is about from 0.001 to 2000 J/cm$^2$. More preferred is the range of about from 0.001 to 100 J/cm$^2$ and most preferred range of exposure energy is about from 0.001 to 5 J/cm$^2$. Lower exposure energy is most useful in large scale manufacturing of optical alignment layers and liquid crystal display elements. Lower exposure energy also minimizes the risk of damage to other materials on the substrates.

The efficiency of the alignment process, and the exposure energy required, may be further impacted by heating, beyond that inherent in the "exposing" step. Additional heating during the exposing step may be accomplished by conduction, convection or radiant heating, or by exposure to unpolarized light. Additional heating may increase the mobility of the molecules during exposure and improve the alignment quality of the optical alignment layer. Additional heating is not a requirement of the process of the invention but may give beneficial results.

The Quality of alignment and electrical properties of the liquid crystal cell assembled from exposed substrates can be improved by heating the substrates after exposure but prior to assembly of the cell. This additional heating of the substrates is not requirement of the process but may give beneficial results.

Exposing also can consist of two or more exposure steps wherein the conditions of each step such as angle of incidence, polarization state, energy density, and wavelength are changed. At least one of the steps must consist of exposure with linearly polarized light. Exposures can also be localized to regions much smaller than the substrate size to sizes comparable to the entire substrate size. A preferred method of dual exposing comprises a two step process of:

(a) exposing at least one optical alignment layer to polarized light at a normal incidence, and (b) exposing the optical alignment layer to polarized light at an oblique incidence.

Another preferred method of dual exposing comprises a two step process of:

(a) exposing said optical alignment layer to polarized light of a first direction of linear polarization of the incident light and (b) exposing said optical alignment layer to polarized light of a second direction of linear polarization of the incident light.

Another preferred method of dual exposing comprises a two step process of:

(a) exposing said optical alignment layer to polarized light of a first direction of linear polarization of the incident light, and (b) exposing said optical alignment layer to polarized light of a second direction of linear polarization of the incident light, at an oblique incidence.

Another preferred method of dual exposing comprises a two step process of:

(a) exposing said optical alignment layer to polarized light of a first direction of linear polarization of the incident light, at an oblique incidence (b) exposing said optical alignment layer to polarized light of a second direction of linear polarization of the incident light, at an oblique incidence.

Applying a liquid crystal medium to the optical alignment can be accomplished by capillary filling of a cell, by casting of a liquid crystal medium onto an optical alignment layer, by laminating a preformed liquid crystal film onto an optical alignment layer or by other methods. Preferred methods are capillary filling of a cell and casting of a liquid crystal medium onto an optical alignment layer. Optical alignment layers are pre-exposed to polarized light or they are exposed after contacting the liquid crystal medium.

A cell can be prepared by using two coated substrates to provide a sandwiched layer of liquid crystal medium. The pair of substrates can both contain optical alignment layers or a conventional alignment layer (e.g., mechanically buffed) can be used as the second alignment layer comprising the same or a different polymer.

As liquid crystal substances used for liquid crystal optical elements, nematic liquid crystal substances, ferroelectric liquid crystal substances, etc. are usable. Useful liquid crystals for the invention described herein include those described in U.S. Pat. No. 5,032,009 and new superfluorinated liquid crystals available from EM Industries, Hawthorne N.Y.

The exposed optical alignment layer induces alignment of a liquid crystal medium at an angle + and −θ with respect to the direction of the linear polarization of the incident light beam and along the plane of the optical alignment layer. One skilled in the art will recognize that the process of the instant invention allows control of the alignment of a liquid crystal medium in any desired direction within the plane of the optical alignment layer by controlling the conditions of the polarized light exposure. Preferably the liquid crystal medium is aligned at an angle + and −θ , where θ is equal to about 90° to the polarization direction.

A liquid crystal display element made by the process of the instant invention is composed of an electrode substrate having at least one optical alignment layer, a voltage-impressing means and a liquid crystal material. FIG. 1 illustrates a typical liquid crystal display element, comprising a transparent electrode 2 of ITO (indium-tin oxide) or tin oxide on a substrate 1 and optical alignment layers 3 formed thereon. The optical alignment layers are exposed to polarized light of a wavelength or wavelengths within the absorption band of the anisotropically absorbing molecules. A spacer concurrently with a sealing resin 4 is intervened between a pair of optical alignment layers 3. A liquid crystal 5 is applied by capillary filling of the cell and the cell is sealed to construct a liquid crystal display element. Substrate 1 may comprise an overcoat film such as an insulating film, a color filter, a color filter overcoat, a laminated polarizing film etc. These coatings and films are all considered part of the substrate 1. Further, active elements such as thin film transistors, a nonlinear resistant element, etc. may also be formed on the substrate 1. These electrodes, undercoats, overcoats, etc. are conventional constituents for liquid crystal display elements and are usable in the display elements of this invention. Using the thus formed electrode substrate, a liquid crystal display cell is prepared, and a liquid crystal substance is filled in the space of the cell, to prepare a liquid crystal display element in combination with a voltage-impressing means.

Examples of the invention compare the properties of polyimides derived from the diamines listed in Table 1.

A mixture of 2,2,3,3,4,4,5,5-octafluoro-1,6-hexanediol (78.63 g, 0.3 mol, Aldrich Chemical Co., Milwaukee, Wis.), 1-fluoro-2,4-dinitrobenzene (18.6 g, 0.10 mmol), triethyl amine (42 mL, 0.3 mol) and acetone (100 mL) was heated to 80° C. for 1.5 hr. After aqueous workup the excess hexanediol removed by Kugelrohr distillation and the dimer by-product was removed by crystallization. The residual oil was treated with pentafluorobenzonitrile (19.3 g, 0.10 mol), triethyl amine (15.3 mL, 0.11 mol) and acetone (100 mL)

TABLE 1

Diamine used in Examples and Comparative Examples of the Invention

| Diamine No. | Structure |
|---|---|
| 1 | $H_2N$—⟨benzene with $CF_3$⟩—$NH_2$ |
| 2 | $NH_2$—⟨benzene with $CN$⟩—$NH_2$ |
| 3 | $H_2N$, $H_2N$—⟨benzene⟩—$CF_3$ |
| 4 | $NH_2$, $NH_2$—⟨benzene⟩—$CN$ |
| 5 | $NH_2$—⟨benzene with $NH_2$⟩—$OCH_2(CF_2)_4CH_2O$—⟨benzene with $F_4$⟩—$CN$ |
| 6 | $C_7F_{15}CH_2O$—⟨benzene⟩—$NH_2$ |

The examples of the invention use fluorinated amines that were prepared by the following procedures:

A mixture of 4-fluoronitrobenzene (141.1 g), 1H,1H-perfluorooctanol (420.1 g), and potassium hydroxide (79.2 g) in 1-methyl-2-pyrrolidinone (1.0 L) was stirred at room temperature for 16 h under a nitrogen atmosphere. The mixture was extracted from aqueous solution and concentrated to give 4-(1H,1H-perfluorooctyloxy)nitrobenzene which was recrystallized and reduced with hydrogen and 5% Pd/C. The crude product was Kugelrohr distilled and recrystallized to give 4-(1H,1H-perfluorooctyloxy)benzeneamine, 6, as crystals, mp 49.1–50.2° C.

and heated to reflux for 4 h. Aqueous workup followed by extraction gave 4-[6-(2,4-dinitrophenoxy)-2,2,3,3,4,4,5,5-octafluorohexyloxy]-2,3,5,6-tetrafluorobenzonitrile as an orange oil.

The oil was reduced with tin chloride dihydrate (140.4 g, 0.624 mol), concentrated hydrochloric acid (97.5 mL) and ethanol (300 mL) at 35–40° C. for 4.25 hr. Aqueous workup with potassium hydroxide (240 g) and extraction gave a crude diamine that was purified by repeated recrystallization to give diamine 5 (mp 97–98.2° C.).

TABLE 2

Summary of Liquid Crystal Alignment Quality for Optically Aligned Polyimides comprising various diamines.

| | | Alignment Quality mm/s scan speed | | | |
|---|---|---|---|---|---|
| | | Before Anneal | | After Anneal | |
| Example No. | Polyimide BTDA + Diamine(s) listed | 0.75 | 1.5 | 0.75 | 1.5 |
| 1 | 1 | Δ++ | Δ++ | ● | ● |
| 2 | 2 | ○ | ○ | ● | ● |
| 3 | 3 | X | X | X++ | X++ |
| 4 | 4 | X | X | X++ | X++ |
| 5 | 1, 5, and 6 | X+ | X+ | ○ | ○ |
| 6 | 2, 5, and 6 | Δ+ | Δ+ | ○+ | ○+ |
| 7 | 3, 5, and 6 | X | X | X++ | X++ |
| 8 | 4, 5, and 6 | X | X | X++ | X++ |

● Excellent alignment, no flow effects, high uniformity
○ Good alignment, low flow effects, uniform
Δ Fair alignment, flow effects, some nonuniformity(mottled or cloudy background)
X Poor alignment, severe flow effects, nonuniform
+ levels of improvement, Δ < Δ+ < Δ++ < ○

The following Examples are meant to illustrate the invention and are not meant to be limiting.

EXAMPLE 1

A mixture of 3,3',4,4'-benzophenonetetracarboxylic dianhydride (6.44 g), 2-(trifluoromethyl)-l,4-benzenediamine, 1, (3.52 g) and γ-butyrolactone (40 g) was stirred at room temperature for 24 h under a nitrogen atmosphere. The solution was diluted to a 10 wt % solution with γ-butyrolactone (49.7 g) and filtered through a 0.45 micron teflon membrane filter. The solution was diluted to 3 wt % solution and spin coated onto soda-lime glass substrates (0.9"×1.2") at 2500 rpms. The coated substrates to were dried at 80° C. for 0.25 h and 180° C. for 1 h in a nitrogen atmosphere and stored in a nitrogen atmosphere at room temperature until used.

Figure 2:
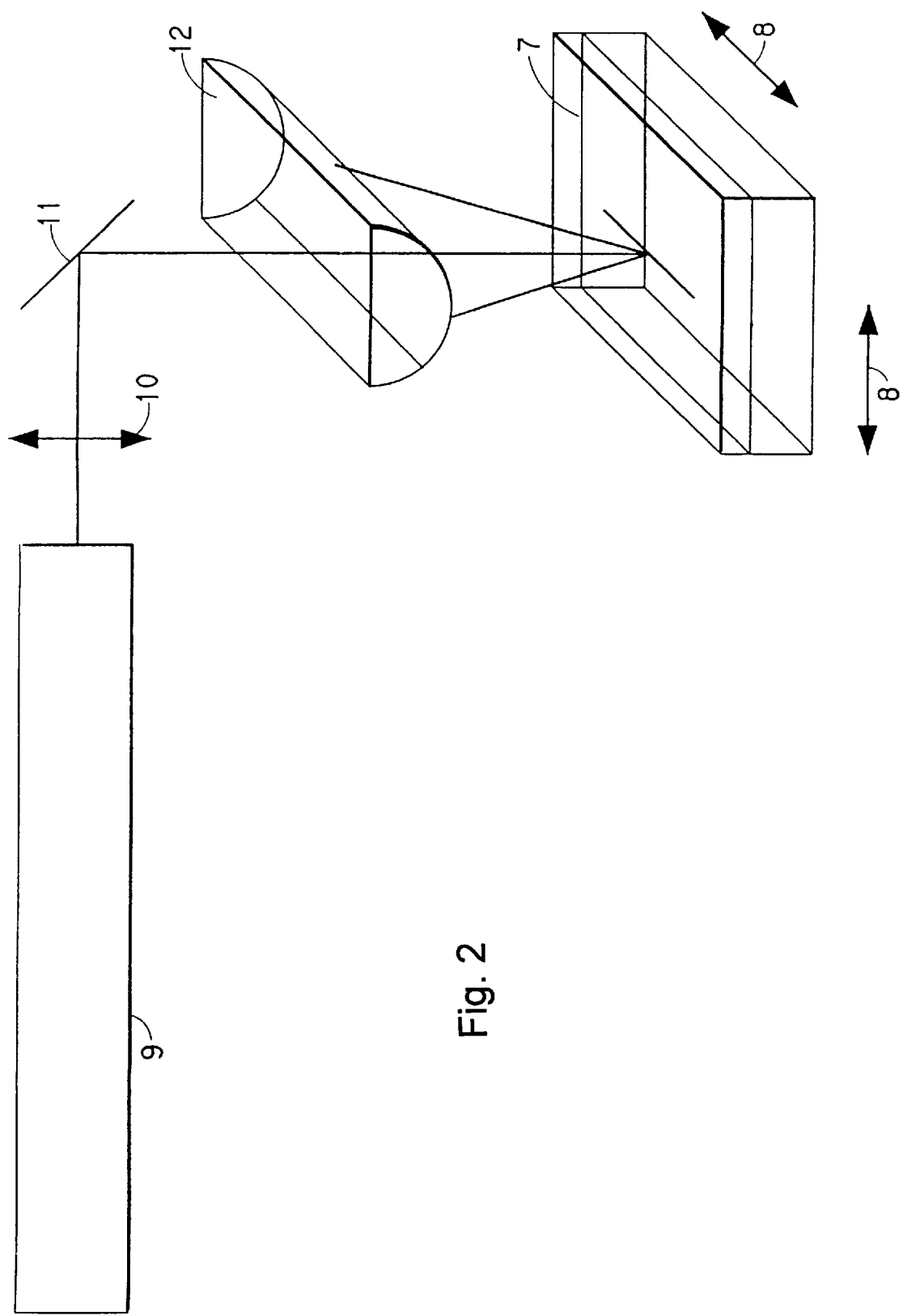
FIG. 2 shows a system which can be used to expose optical alignment layers to ultraviolet light.

The coated substrates were exposed to ultraviolet polarized light using the set-up schematically represented in FIG. 2. In this experiment each coated substrate 7 was mounted onto a 2-axis XY translation stage (indicated by double-headed arrows 8 in FIG. 2) with the coated side facing the incident laser beam. An Innova 400 (Coherent Incorporated, Santa Clara, Calif.) laser 9 was tuned to lase in the ultraviolet with wavelengths ranging from 300 to 336 nm. The 1 cm polarized beam 10 was directed with mirror 11 to a 5 cm focal length cylindrical lens 12 which focused the incident 1 cm beam to a line (1 cm×200 μm) onto each coated substrate 7. The coated substrate was translated at a 0.75 mm/s constant speed along the Y direction and then stepped in the X direction. This was repeated until the coated substrate had been completely exposed. The incident optical power was about 0.4 Watts and the ultraviolet light was polarized along 10.

After exposure, the substrates were assembled with orthogonal orientation of the optically generated alignment direction. The cell thickness was about 4 microns. The cell was subsequently capillary filled with nematic liquid crystals. As expected, the liquid crystals were observed to align in a twisted nematic orientation when viewed between polarizers. Upon annealing the liquid crystal cell above the liquid crystal isotropic point (95 degrees C. for 30 minutes), the uniformity of the alignment was observed to improve. The quality of the alignment for the cell is described in Table 2.

In another trial, two coated substrates were treated identically as described above except that the coated substrates were translated at 1.5 mm/s constant speed. The cell was fabricated as before and it was observed to align in a twisted nematic orientation when viewed between polarizers. Upon annealing the liquid crystal cell above the liquid crystal isotropic point (95 degrees C. for 30 minutes), the uniformity of the alignment was observed to improve. The quality of the alignment for the cell is described in Table 2.

EXAMPLE 2

A mixture of 3,3', 4,4'-benzophenonetetracarboxylic dianhydride (6.44 g), 2,5-diaminobenzonitrile, 2, (2.66 g) and γ-butyrolactone (37.8 g) was stirred at room temperature for 20 h under a nitrogen atmosphere. The solution was diluted to a 10 wt % solution with γ-butyrolactone (43.9 g) and filtered through a 0.45 micron teflon membrane filter. The solution was diluted to 3 wt % solution and spin coated, cured and exposed to polarized light as described in Example 1. The exposed substrates were assembled tested and evaluated as described in Example 1 and the results are listed in Table 2.

EXAMPLE 3 (COMPARATIVE)

A mixture of 3,3',4,4'-benzophenonetetracarboxylic dianhydride (4.83 g), 5-(trifluoromethyl)-1,3-benzenediamine, 3, (2.64 g) and γ-butyrolactone (30.3 g) was stirred at room temperature for 24 h under a nitrogen atmosphere. The solution was diluted to a 10 wt % solution with γ-butyrolactone (36.8 g) and filtered through a 0.45 micron teflon membrane filter. The solution was diluted to 3 wt % solution and spin coated as described in Example 1. The exposed substrates were assembled tested and evaluated as described in Example 1 and the results are listed in Table 2.

EXAMPLE 4 (COMPARATIVE)

A mixture of 3,3',4,4'-benzophenonetetracarboxylic dianhydride (4.83 g), 3,5-diaminobenzonitrile, 4, (2.00 g) and γ-butyrolactone (27.3 g) was stirred at room temperature for 24 h under a nitrogen atmosphere. The solution was diluted to a 10 wt % solution with γ-butyrolactone (33.5 g) and filtered through a 0.45 micron teflon membrane filter. The solution was diluted to 3 wt % solution and spin coated as described in Example 1. The exposed substrates were assembled tested and evaluated as described in Example 1 and the results are listed in Table 2.

EXAMPLE 5

A mixture of 3,3',4,4'-benzophenonetetracarboxylic dianhydride (70.9 g), 2-(trifluoromethyl)-1,4-benzenediamine, 1, (34.86 g), diamine 5 (5.95 g), 4-(1H,1H-perfluorooctyloxy) benzeneamine, 6, (5.40 g) and γ-butyrolactone (470 g) was stirred at room temperature for 24 h under a nitrogen atmosphere. The solution was diluted to a 10 wt % solution with γ-butyrolactone (585.0 g) and filtered through a 0.45 micron teflon membrane filter and stored in a refrigerator under nitrogen until used. The solution was diluted to 5 wt % solution and spin coated as described in Example 1. The exposed substrates were assembled tested and evaluated as described in Example 1 and the results are listed in Table 2.

EXAMPLE 6

A mixture of 3,3',4,4'-benzophenonetetracarboxylic dianhydride (6.44 g), 2,5-diaminobenzonitrile, 2, (2.46 g), diamine 5 (0.541 g), 4-(1H,1H-perfluorooctyloxy)

benzeneamine, 6, (0.491 g) and γ-butyrolactone (40.0 g) was stirred at room temperature for 24 h under a nitrogen atmosphere. The solution was diluted to a 10 wt % solution with γ-butyrolactone (49.8 g) and filtered through a 0.45 micron teflon membrane filter. The solution was diluted to 5 wt % solution and spin coated as described in Example 1. The exposed substrates were assembled tested and evaluated as described in example 1 and the results are listed in Table 2.

EXAMPLE 7 (COMPARATIVE)

A mixture of 3,3',4,4'-benzophenonetetracarboxylic dianhydride (161.1 mg), 3,5-diaminobenzotrifluoride, 3, (79.2 mg), diamine 5 (13.5 mg), 4-(1H,1H-perfluorooctyloxy) benzeneamine, 6, (12.3 mg) and γ-butyrolactone (1.15 g) was stirred at room temperature for 22.5 h under a nitrogen atmosphere. The solution was diluted to a 5 wt % solution with γ-butyrolactone (3.90 g) and filtered through a 0.45 micron teflon membrane filter and spin coated as described in Example 1. The exposed substrates were assembled tested and evaluated as described in Example 1 and the results are listed in Table 2.

EXAMPLE 8 (COMPARATIVE)

A mixture of 3,3',4,4'-benzophenonetetracarboxylic dianhydride (161.1 mg), 3,5-diaminobenzonitrile, 4, (60 mg), diamine 5 (13.5 mg), 4-(1H,1H-perfluorooctyloxy) benzeneamine, 6, (12.3 mg) and γ-butyrolactone (1.15 g) was stirred at room temperature for 22.5 h under a nitrogen atmosphere. The solution was diluted to a 5 wt % solution with γ-butyrolactone (3.54 g) and filtered through a 0.45 micron teflon membrane filter and spin coated as described in Example 1. The exposed substrates were assembled tested and evaluated as described in Example 1 and the results are listed in Table 2.

We claim:

1. A process for inducing alignment of a liquid crystal medium adjacent to a surface of an optical alignment layer comprising:

(a) exposing at least one optical alignment layer to polarized light; the polarized light having a wavelength within the absorption band of said optical alignment layer; wherein the exposed alignment layer induces alignment of the liquid crystal medium at an angle + and −θ with respect to the direction of the polarization of the incident light beam and along the surface of the optical alignment layer; and (b) applying a liquid crystal medium to the optical alignment layer, wherein the optical alignment layer is a polyimide of structure I

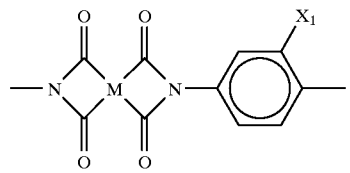

comprising the reaction product of at least one tetracarboxylic dianhydride and an amine component, wherein the amine component comprises a 2-substituted 1,4-benzenediamine wherein the 2-substituent $X_1$ is an electron withdrawing group having a positive σ, and M is a tetravalent organic radical derived from said tetracarboxylic dianhydride containing at least two carbon atoms, no more than two carbonyl groups of the dianhydride being attached to any one carbon atom of the tetravalent radical.

2. A process of claim 1 wherein $X_1$ is selected from the group —CN, —CF$_3$, F, Cl, Br, I, —NO$_2$, —CO$_2$R, and —CON(R)$_2$, wherein R is H or a $C_1$–$C_4$ hydrocarbon.

3. A process of claim 2 wherein $X_1$ is selected from the group —CN and —CF$_3$.

4. A process of claim 1 wherein the tetracarboxylic dianhydride is selected from 3,3',4,4'-benzophenonetetracarboxylic dianhydride and 2,2'-dichloro-4,4',5,5'-benzophenone tetracarboxylic dianhydride.

5. A liquid crystal display element comprising a liquid crystal medium aligned by the process of claim 1.

* * * * *